United States Patent [19]
Rico

[11] Patent Number: 4,981,737
[45] Date of Patent: Jan. 1, 1991

[54] TOOL WRAP

[76] Inventor: Nicholas Rico, 17627 Merry Oaks Trail, Chagrin Falls, Ohio 44022

[21] Appl. No.: 412,568

[22] Filed: Sep. 25, 1989

Related U.S. Application Data

[63] Continuation of Ser. No. 234,989, Aug. 22, 1988, abandoned.

[51] Int. Cl.⁵ .......................... B32B 7/06; B32B 7/12
[52] U.S. Cl. .................................... 428/40; 74/551.9; 428/423.1
[58] Field of Search .................. 273/81.5, 81.6, 81 D, 273/75; 428/40, 423.1; 74/551.9

[56] References Cited

U.S. PATENT DOCUMENTS 3,848,480 11/1974 Oseroff et al. ................. 273/81.5 X
4,346,205 5/1980 Hiles .
4,567,091 1/1986 Spector .......................... 273/81.5 X
4,683,709 8/1987 Vasko et al. .

Primary Examiner—Alexander S. Thomas
Attorney, Agent, or Firm—Oldham & Oldham Co.

[57] ABSTRACT

Disclosed is a vibration damping tool wrap in the form of a flat laminate of specific size and shape so as to conform generally to a tool handle of specific size and shape when wrapped therearound. The laminate comprises an energy absorbing elastomeric layer, a protective cover layer covering one surface of the elastomeric layer, an adhesive coating on the other surface of the elastomeric layer, and a release sheet covering said adhesive coating. When it is desired to affix the handle wrap to a tool handle, the release sheet is peeled off and the wrap is secured to the tool handle via the exposed pressure-sensitive adhesive coating. An adhesive coated (on one side only) strip of the cover material may be used to conceal the seam which results when the wrap of this invention is wrappd around a tool handle.

8 Claims, 1 Drawing Sheet

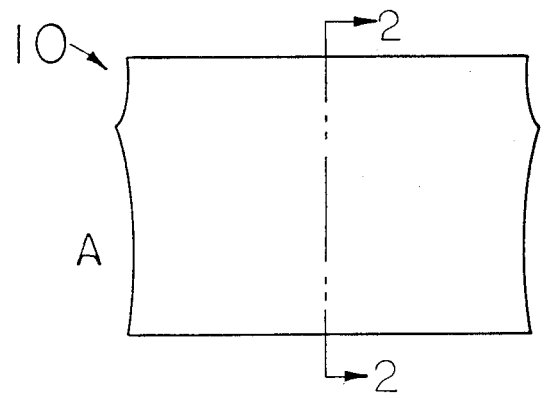
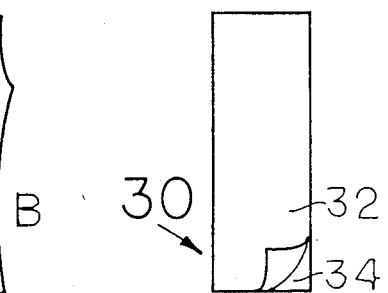
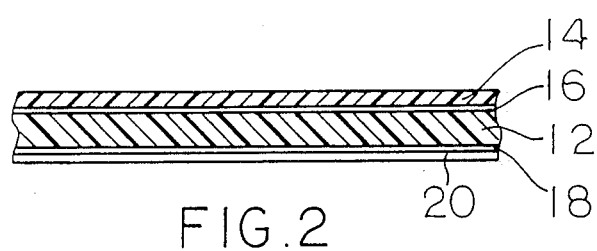
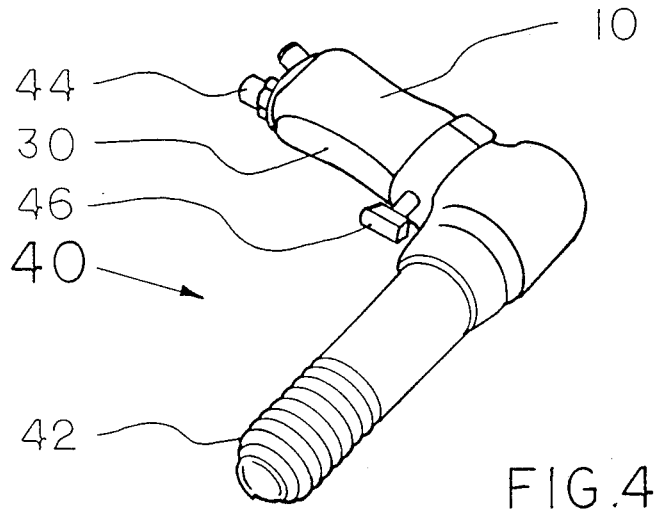

TOOL WRAP

This is a continuation of copending application Ser. No. 07/234,989, filed on Aug. 22, 1988, now abandoned.

TECHNICAL FIELD

This invention relates to tool handles for hand-held tools and especially to a novel tool wrap for reducing shock and vibrations transmitted from the tool to the user's hand.

BACKGROUND ART

Energy absorbing elastomeric materials and their use in automobile bumpers are well known. Such elastomers are particularly useful for dampening shock caused by a low speed collision (i.e., at a relative speed of up to about 5-10 mph). Typically the bumper includes an energy absorbing thermoplastic polyurethane elastomer. One such energy absorbing elastomer is disclosed in U.S. Pat. No. 4,346,205 to Hiles. Basically, this elastomer is a non-cellular polyurethane having a low compression set (less than 5%) and a delayed recovery from compression (longer than 0.7 seconds).

Various vibration dampening molded plastic (including elastomeric) parts of specific shape are also known. Among these are handle grips which are adapted to fit over a handle of specific size and shape. Since these are molded to specific shape, they are relatively expensive to make.

DISCLOSURE OF THE INVENTION

This invention provides an energy absorbing tool wrap in the form of a flat laminate of such size and shape as to conform generally to the exterior surface of a tool handle of specific size and shape when wrapped therearound. The wrap of this invention comprises an energy absorbing layer of elastomeric material, a protective cover layer covering one surface of the energy absorbing layer and bonded thereto, a thin pressure-sensitive adhesive coating on the other surface of the energy-absorbing layer, and a release sheet removeably affixed to said other surface via said pressure-sensitive adhesive coating.

BRIEF DESCRIPTION OF THE DRAWINGS

In the drawings:

FIG. 1 is a plan view of a tool wrap according to the present invention.

FIG. 2 is a fragmentary cross-sectional view, taken along line 2—2 of FIG. 1 and showing the layers of a laminate according to this invention.

FIG. 3 is a plan view of a strip for concealing the seam which results when a wrap of the present invention is wrapped around a tool handle.

FIG. 4 is a perspective view of a hand tool with a tool wrap of this invention wrapped around the tool handle.

BEST MODE FOR CARRYING OUT THE INVENTION

FIG. 1 shows in plan view a representative tool wrap of this invention. The tool wrap 10 is in the form of a comparatively thin, flat laminate, whose structure will be described in detail with reference to FIG. 2. The size and shape of the tool wrap is customized to the size and shape of the tool handle which it is to fit. In other words, the tool wrap is of such size and shape as to be adapted to be wrapped around a tool handle of specific size and shape and to conform generally to the exterior surface of the tool handle when so wrapped. The lower edge of the wrap 10 will substantially coincide with the lower or butt edge of the tool handle. The upper edge of the wrap 10 will substantially coincide with the upper or shank end of the tool handle. The two sides A and B will be in close proximity with each other when tool wrap 10 is wrapped around the tool handle; the two sides A and B will preferably almost exactly coincide, but there may be a slight overlap or a slight gap.

Referring now to FIG. 2, tool wrap 10 comprises an energy absorbing elastomeric layer 12, a protective cover layer 14 covering one surface of the energy absorbing layer 12, a first adhesive coating layer 16 for bonding the cover layer 14 to the energy absorbing layer 12, a second thin pressure-sensitive adhesive coating 18 on the other surface of the energy absorbing layer 12, and a release sheet 20 removeably affixed to said other surface via said pressure-sensitive adhesive coating 18.

First adhesive layer 16 can be omitted. It is possible to mold the energy absorbing layer 12 (which is preferably thermoplastic) and to bond protective covering 14 adherently to the energy absorbing layer 12 during the molding process without the use of an adhesive.

The elastomeric material forming absorbing layer 12 has a low compression set (less than 15%, preferably less than 5%) and a delayed recovery from compression (longer than 0.7 seconds). The preferred energy absorbing material is "Sorbothane", which is sold by Sorbo, Inc. of Twinsburg, Ohio. "Sorbothane" is believed to be a substantially linear thermoplastic polyurethane having excess hydroxyl end groups, as described in U.S. Pat. No. 4,346,205 to Hiles. The thickness of layer 12 may range from about 0.02 to about 0.2 inch, preferably from about 0.04 inch to about 0.10 inch, the thickness increasing as the frequency of vibration of the tool becomes higher. Other characteristics of layer 12, are: the polyurethane is noncellular, elongation at break is at least 500%, and Shore 00 hardness is generally less than 70. For a further description of preparation and the properties of a suitable flexible polyurethane elastomer for layer 12, the reader is referred to said U.S. Pat. No. 4,346,205, which is incorporated by reference.

Because layer 12 is of a material which is relatively soft and easily torn, it is necessary to protect this material by covering it with a "skin" of tougher plastic material. One surface (the first or outer surface) of energy absorbing layer 12 is covered with a thin protective cover layer 14 of a tough, flexible plastic material having good abrasion, scuff and tear resistance, and which preferably also has good resistance to chemicals and rays (such as sunlight and ultraviolet) which are encountered in the environment. The preferred cover sheet material is also polyurethane (although having quite different properties from those of layer 12); polyvinyl chloride and polyolefins can also be used. Layer 14 is generally much thinner than layer 12; layer 14 typically has a thickness of about 0.01 to about 0.03 inch, although the thickness may range up to about 0.05 inch. Cover layer 14 may be bonded to energy absorbing layer 12 by means of a thin adhesive coating which is applied to either layer 12 either directly (i.e., without an adhesive) or by means of a thin adhesive coating which is applied to either layer 12 or layer 14 during assembly.

A pressure-sensitive adhesive coating 18 covers the surface of elastomeric layer 12 which is not covered by cover layer 14 (i.e., the second surface of elastomeric layer 12). This adhesive coating may be either a permanent pressure-sensitive adhesive (i.e., one which bonds to the substrate or tool handle tightly so that the tool wrap could not be removed without damage) or a releaseable pressure-sensitive adhesive (i.e., one which would permit the tool wrap 10 to be peeled off the tool handle without damage). In either case, suitable adhesives are known in the art and acrylics are particularly preferred. Pressure-sensitive adhesive coating 18 is covered with a release sheet 20.

A seam strip 30, shown in FIG. 3, is provided to conceal the seam which results when tool handle wrap 10 is wrapped around a tool handle. Seam strip 30 comprises a thin plastic sheet 32, which is preferably of the same material, same thickness and same color as cover layer 14 of tool wrap 10. A release sheet 34 covers this adhesive layer.

Drawings herein are not necessarily to scale. In particular, thicknesses, particularly the thicknesses of adhesive layer 16 and 18 in FIG. 2, have been greatly exaggerated.

Application of a tool wrap 10 to a tool 40 will now be described with particular reference to FIGS. 4 and 5. Referring now to FIG. 4, release sheet 20 is peeled off the tool wrap 10 and the exposed adhesive coated surface of the elastomeric layer 12 is pressed against the tool handle 44. Care should be taken to align the tool wrap 10 properly, so that the bottom edge of tool wrap 10 coincides with the butt edge of handle 44 and the top edge of tool wrap 10 coincides with the edge of tool handle 44 at the shank end (the end at which the tool handle 44 joins the head or working portion 42 of tool 40). The vertical centerline (the line along which line 2—2 of FIG. 1 is shown) of tool wrap 10 is placed on the centerline at the back of tool handle 44 first. Tool wrap 10 is pressed along its centerline against the back centerline of tool handle 44. Then, working from the centerline on either side, one presses the tool wrap 10 around the handle 44 without stretching the tool wrap. When the tool wrap has been fully affixed to the handle, the two side edges A and B of tool wrap 10 are in proximity with each other at the front of tool handle 44. Ideally the two edges A and B will . exactly coincide (this happens only when the width of tool wrap 10 at both the upper and lower edges exactly matches the circumference of the tool handle at the shank and butt ends, respectively). Frequently there is slight overlap or a slight gap where edges A and B come together. In any case, there is a seam. This seam may be concealed by applying adhesive coated seam strip 30 over the seam and the adjacent portions of tool wrap 10.

As installed, the cover layer 14 forms the outermost layer of tool wrap 10, and energy absorbing layer 12 and the adhesive coating 18 thereon are next to the tool handle 44. Sheet 32 of edge strip 30 is placed on top of cover layer 14, with the adhesive coated side of sheet 32 against the cover layer 14.

The laminate of the present invention provides an efficient energy-absorbing wrap for a hand tool at low cost. Up to 94% of the impact (i.e., vibration and impact shock) of the tool is dissipated before it reaches the user's hand. This greatly reduces the amount of pain and fatigue for the user. It will be appreciated that tool wrap 10 can be made in a variety of sizes and shapes to fit the various sizes and shapes of hand-held tools, and if the particular tool (a hand-held drill) shown in FIGS. 4 and 5 is merely representative of the numerous types of vibrations-producing hand-held tools whose handles may be covered in accordance with this invention.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. An energy absorbing tool wrap for a hand-held power tool,
    said wrap being in the form of a flat laminate of such size and shape as to be adapted o be wrapped once around a tool handle of specific size and shape and to conform generally to the exterior surface of the tool handle when so wrapped, said wrap comprising:
    (a) an energy absorbing layer of an energy absorbing non-cellular elastomeric polyurethane having an elongation at break of at least 500 percent a Shore 00 hardness of up to about 70, a compression set less than 15 percent, and a recovery from compression exceeding 0.7 seconds,
    (b) a protective cover layer covering one surface of said energy absorbing layer and bonded thereto,
    (c) a thin pressure sensitive adhesive coating on the other surface of said energy absorbing layer, and
    (d) a release sheet removably affixed to said other surface via said pressure sensitive adhesive coating,
    said tool wrap having two paris of opposite edges and being of such configuration that one edge of the first pair of opposite edges substantially coincides with the butt edge of the tool handle, the second edge of the first pair substantially coincides with the shank edge of said tool handle and the second pair of opposite edges substantially coincide with each other, when said tool wrap is wrapped once around said tool handle.

2. A tool wrap according to claim 1 wherein the thickness of said energy absorbing layer is from about 0.02 to about 0.2 inch.

3. A tool handle wrap according to claim 2 wherein the thickness of said energy absorbing layer is from about 0.04 to about 0.10 inch.

4. A tool handle wrap according to claim 1 wherein said cover layer is a thin flexible polyurethane sheet.

5. A tool wrap according to claim 1 in which said energy absorbing polyurethane has a compression set less than 5%.

6. A hand held power tool having a working portion and a handle, said handle having applied thereto an energy absorbing tool wrap, which is wrapped once around said tool handle and which conforms generally to the exterior surface of the tool handle, said wrap comprising:
    (a) an energy absorbing layer of an energy absorbing elastomeric polyurethane having an elongation at break of at least 500 percent, a shore 00 hardness of up to about 70, a compression set less than 15 percent, and a recovery from compression exceeding 0.7 seconds,
    (b) a protective cover layer covering one surface of said energy absorbing layer and bonded thereto, and
    (c) a thin pressure sensitive adhesive coating on the other surface of said energy absorbing layer,
    said tool wrap having two pairs of opposite edges, and being of such configuration that one edge of the first pair of opposite edges substantially coincides with the butt edge of the tool handle, the second edge of the first pair substantially coincides with the shank edge of the tool handle and the second pair of opposite edges substantially coincide with each other.

7. A hand held power tool according to claim 6 in which said elastomeric polyurethane is non-cellular.

8. A hand held power tool according to claim 6, further including a seam strip which covers said second pair of edges.

* * * * *